(12) United States Patent
Horie

(10) Patent No.: US 8,687,153 B2
(45) Date of Patent: Apr. 1, 2014

(54) SUBSTRATE, AND DISPLAY PANEL PROVIDED WITH SUBSTRATE

(75) Inventor: Wataru Horie, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 153 days.

(21) Appl. No.: 12/998,949

(22) PCT Filed: Dec. 18, 2009

(86) PCT No.: PCT/JP2009/007035
§ 371 (c)(1),
(2), (4) Date: Jun. 17, 2011

(87) PCT Pub. No.: WO2010/070929
PCT Pub. Date: Jun. 24, 2010

(65) Prior Publication Data
US 2011/0249339 A1 Oct. 13, 2011

(30) Foreign Application Priority Data

Dec. 19, 2008 (JP) .................................. 2008-324523

(51) Int. Cl.
*G02F 1/1335* (2006.01)
*G02B 1/10* (2006.01)

(52) U.S. Cl.
USPC ........... 349/106; 349/110; 349/137; 349/156; 359/586

(58) Field of Classification Search
USPC ............ 349/106, 110, 156, 114, 137; 430/25; 359/586
See application file for complete search history.

(56) References Cited

U.S. PATENT DOCUMENTS

| | | | | |
|---|---|---|---|---|
| 4,529,272 A | * | 7/1985 | Kruger et al. ................. | 349/137 |
| 7,342,636 B2 | * | 3/2008 | Lee et al. ...................... | 349/156 |
| 7,515,357 B2 | * | 4/2009 | Segawa et al. ................ | 359/740 |
| 2008/0218866 A1 | * | 9/2008 | Kawata et al. ................ | 359/609 |

FOREIGN PATENT DOCUMENTS

| | | |
|---|---|---|
| EP | 0 596 733 | 5/1994 |
| JP | 4-304423 A | 10/1992 |
| JP | 6-148621 A | 5/1994 |
| JP | 6-331817 A | 12/1994 |
| JP | 7-043519 A | 2/1995 |
| JP | 7-239411 A | 9/1995 |

(Continued)

OTHER PUBLICATIONS

Preliminary Report on Patentability for International Application No. PCT/JP2009/007035 dated Jul. 14, 2011.

*Primary Examiner* — Audrey Y Chang
(74) *Attorney, Agent, or Firm* — Harness, Dickey & Pierce, P.L.C.

(57) ABSTRACT

A substrate for use in a display panel includes a transparent substrate and a light blocking layer which includes two layers of different optical densities. A low optical density layer that is one of the two layers of different optical densities which has a lower optical density is interposed between a high optical density layer that is the other one of the two layers which has a higher optical density and the transparent substrate. The sum of the optical density of the low optical density layer and the optical density of the high optical density layer is not less than 3.0. According to the present invention, a substrate which includes a low-reflectance light blocking layer is provided, the substrate being suitably used as a color filter substrate of a display device which has a low reflection structure, such as a low reflection film.

10 Claims, 8 Drawing Sheets

(56) References Cited

FOREIGN PATENT DOCUMENTS

| | | |
|---|---|---|
| JP | 8-029768 A | 2/1996 |
| JP | 9-297209 A | 11/1997 |
| JP | 10-301499 A | 11/1998 |
| JP | 11-095009 A | 4/1999 |
| JP | 11-119007 A | 4/1999 |
| JP | 2000-029006 A | 1/2000 |
| JP | 2000-121825 A | 4/2000 |
| JP | 2000-206314 A | 7/2000 |
| JP | 2000-303163 A | 10/2000 |
| JP | 2000-329924 A | 11/2000 |
| JP | 2005156695 A | 6/2005 |

* cited by examiner

FIG.4
(a) 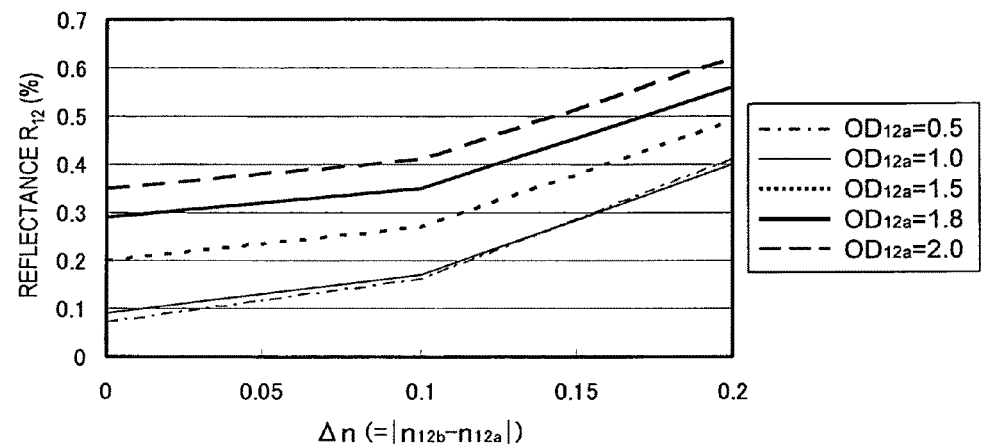
(b) 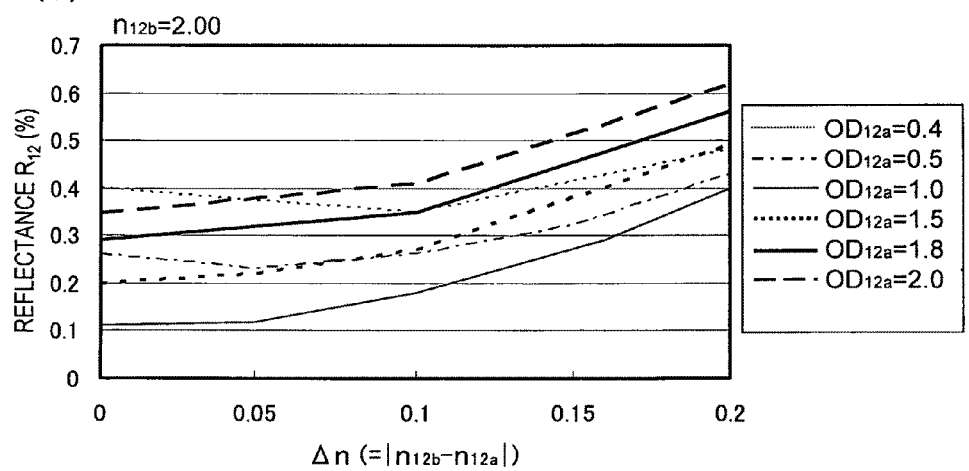

FIG.8
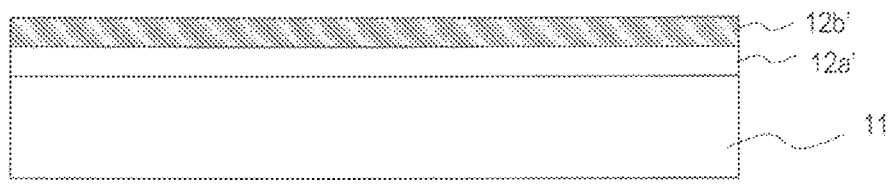
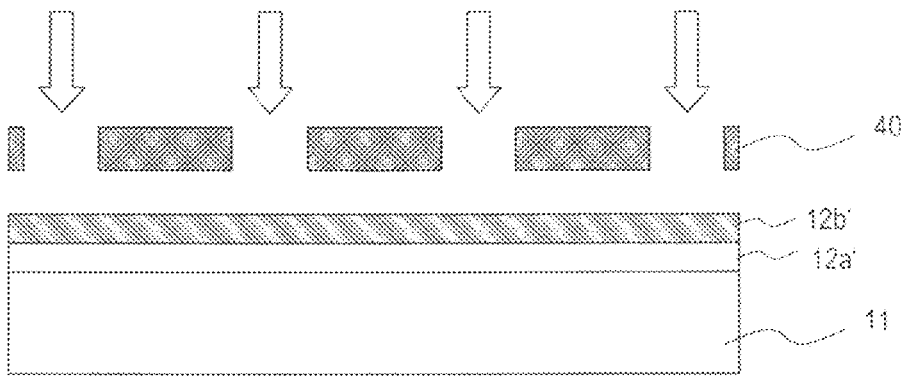
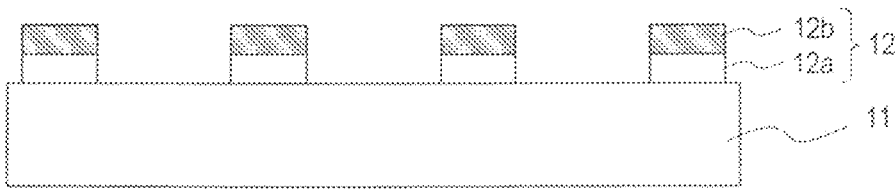

SUBSTRATE, AND DISPLAY PANEL PROVIDED WITH SUBSTRATE

TECHNICAL FIELD

The present invention relates to a substrate and to a display panel which includes the substrate.

BACKGROUND ART

Among display panels, such as liquid crystal display panels, reflection of external light at the surface is unfavorable. If the reflectance of external light at the surface is large, images of a viewer himself, objects that are placed around the panel, lighting devices, etc., are reflected in the panel surface, deteriorating the visibility of display. Particularly in a bright environment, excessive reflection of external images occurs. One of the existing solutions to this problem is to provide a low reflection structure at the surface of the display panel such that the reflection of external light is reduced.

As a low reflection structure which reduces the reflection at the surface of the display panel, an antireflection technique which utilizes a so-called "moth-eye" structure has been disclosed (Patent Document 1). By providing a low reflection film which has a moth-eye structure at the surface of the display panel, the reflectance of external light at the surface of the display panel is decreased to about 1% or lower. However, even if the reflectance at the surface of the display panel is decreased, reflection may occur, or the contrast ratio of display may decrease, due to light reflected inside the display panel. Therefore, it is necessary to decrease the reflectance inside the display panel.

The internal reflection of the display panel is now described with an example of a liquid crystal display panel. The liquid crystal display panel includes a pair of substrates and a liquid crystal layer interposed between the substrates. One of the pair of substrates includes pixel electrodes and TFTs that are in a matrix arrangement, and bus lines, for example. This substrate is hereinafter referred to as "TFT substrate". The other substrate includes a counter electrode, a color filter, and a light blocking layer (black matrix). This substrate is hereinafter referred to as "counter substrate". Typically, the counter substrate is placed at the viewer side of the liquid crystal layer. In the example liquid crystal display panel described hereinbelow, the counter substrate is placed at the viewer side of the liquid crystal layer.

External light impinging on the liquid crystal display panel is partially reflected by a surface of the liquid crystal display panel which is in contact with the air (outermost surface). In other words, external light impinging on the liquid crystal display panel is reflected at the interface between the counter substrate and the air. Usually, the counter substrate has a polarizer at the viewer side, and therefore, the reflection occurs at the interface between the surface of the polarizer and the air. In this specification, reflection by the surface of the liquid crystal display panel which is in contact with the air (hereinafter, simply referred to as "the surface of the liquid crystal display panel") is referred to as "surface reflection". The reflectance of this surface reflection is sometimes referred to as "surface reflectance". Light transmitted through the surface of the liquid crystal display panel is partially reflected by the counter substrate and the TFT substrate. In this specification, reflection other than the surface reflection is referred to as "internal reflection". The reflectance of the internal reflection is referred to as "internal reflectance".

Among the internal reflections of the liquid crystal display panel, the internal reflection caused by the counter substrate has a large intensity. Large part of the internal reflection caused by the counter substrate is constituted of internal reflection that occurs at the interface between the transparent substrate and the light blocking layer of the counter substrate. For example, when a chromium film is used as the light blocking layer, the reflectance of the interface between the transparent substrate and the light blocking layer is about 50%. When the light blocking layer used is made of a resin in which carbon black is mixed, the reflectance of the interface between the transparent substrate and the light blocking layer is about 1.5%.

However, as described above, when a low reflection film which has a moth-eye structure is provided such that the surface reflectance is decreased to about 1.0% or lower, it is necessary to further reduce the internal reflection.

Known techniques of reducing the internal reflection caused by the light blocking layer are disclosed in, for example, Patent Documents 2 to 5.

The technique disclosed in Patent Document 2 is to provide an antireflection layer at the viewer side of the light blocking layer such that the internal reflection caused by the light blocking layer is reduced. Patent Document 2 discloses that, when chromium is used as the material for the light blocking layer and chromium oxide is used as the material for the antireflection layer, the reflectance of the light blocking layer can be decreased from 50% to 1%.

Patent Document 3 discloses that a low reflection layer, a light absorption layer, and a light blocking layer are stacked in this order, whereby the reflectance can be decreased. According to Patent Document 3, when the respective layers contain titanium oxide as a major constituent and the density of the titanium oxide decreases in order of the low reflection layer, the light absorption layer, and the light blocking layer, the internal reflectance can be decreased to 8%.

Patent Document 4 and Patent Document 5 disclose the techniques of reducing the internal reflection caused by the light blocking film by means of a low reflection layer provided between the transparent substrate and the light blocking layer. Patent Document 4 discloses that a layer which is made of a metal that contains nickel and titanium as major constituents can preferably be used as the light blocking layer and that a layer which is made of an oxide, nitride, carbide or oxynitride of a metal that contains nickel and titanium as major constituents can preferably be used as the low reflection layer. Patent Document 5 discloses that the respective layers can be formed using nickel and tantalum, instead of nickel and titanium disclosed in Patent Document 4.

CITATION LIST

Patent Literature

Patent Document 1: Japanese Laid-Open Patent Publication No. 2005-156695
Patent Document 2: Japanese Laid-Open Patent Publication No. 6-148621
Patent Document 3: Japanese Laid-Open Patent Publication No. 2000-303163
Patent Document 4: Japanese Laid-Open Patent Publication No. 2000-121825
Patent Document 5: Japanese Laid-Open Patent Publication No. 2000-206314

SUMMARY OF INVENTION

Technical Problem

The techniques disclosed in Patent Document 2 and Patent Document 3 can reduce the internal reflection caused by the light blocking layer. However, even when the configurations disclosed in these documents are employed, the internal reflectance of the light blocking layer is several percents. Therefore, when the techniques disclosed in Patent Document 2 and Patent Document 3 are applied to a display panel in which a low reflection film is provided such that the surface reflectance is decreased to several percents or lower, the effect of reducing the surface reflection cannot be sufficiently obtained.

Simulation results of the reflectance of a substrate in which a chromium oxide antireflection layer is provided on a chromium light blocking layer as disclosed in Patent Document 2, for example, are described with reference to FIG. 11. FIG. 11 is a cross-sectional view schematically showing a configuration of a substrate 80 which was used in the simulation. The substrate 80 includes a glass substrate 81, a 120 nm thick light blocking layer 82 which is made of chromium (refractive index: 3.47), and a 30 nm thick antireflection layer 84 which is made of chromium oxide (refractive index: 2.50). The antireflection layer 84 is provided between the light blocking layer 82 and the glass substrate 81. The simulation program used was OPTAS-FILM Version 3.40 (manufactured by OPTO Inc.). The reflectance for the case where light perpendicularly impinges on the surface of the glass substrate 81 was simulated. The light source used was a C light source. The reflectance was calculated with a correction to the spectral luminous efficacy. The reflectance was 17.9%. Here, the reflectance which has undergone the spectral luminous efficacy correction is the Y value of the tristimulus values X, Y and Z of the reflection from an object in the XYZ colorimetric system adopted by the CIE (Commission Internationale de l'Eclairage) in 1931. Note that X, Y and Z are obtained according to the following formulae.

$$X = K \int_{380}^{780} S(\lambda)\bar{x}(\lambda)R(\lambda)d\lambda$$

$$Y = K \int_{380}^{780} S(\lambda)\bar{y}(\lambda)R(\lambda)d\lambda$$

$$Z = K \int_{380}^{780} S(\lambda)\bar{z}(\lambda)R(\lambda)d\lambda$$

$$K = \frac{100}{\int_{380}^{780} S(\lambda)\bar{y}(\lambda)R(\lambda)d\lambda}$$

S(λ): Spectral Distribution of C Light Source
x̄(λ), ȳ(λ), z̄(λ): Color Matching Functions in XYZ Colorimetric System
R(λ): Spectral Solid Angle Reflectance On the other hand, Patent Document 4 and Patent Document 5 fail to provide a specific disclosure other than the statement about the optical characteristics of the low reflection layer that the low reflection layer preferably has a higher transmittance than the light blocking layer. Therefore, it is unclear what optical characteristics the low reflection layer should have in order to decrease the reflectance. The techniques disclosed in Patent Document 4 and Patent Document 5 include stacking a low reflection layer which is made of a metal oxide, or the like, on a light blocking layer which is made of a metal, as in the technique disclosed in Patent Document 2, and therefore, the internal reflectance of the light blocking layer is probably high.

The present invention was conceived for the purpose of solving the above problems. One of the objects of the present invention is to provide a substrate that is for use in a display panel, in which the internal reflection caused by a light blocking layer is reduced.

Solution to Problem

A substrate of the present invention, which is for use in a display panel, includes a transparent substrate and a light blocking layer which includes two layers of different optical densities, wherein a low optical density layer that is one of the two layers of different optical densities which has a lower optical density is interposed between a high optical density layer that is the other one of the two layers which has a higher optical density and the transparent substrate, and a sum of an optical density of the low optical density layer and an optical density of the high optical density layer is not less than 3.0.

In one embodiment, a refractive index of the high optical density layer is less than 3.00, and the optical density of the low optical density layer is not less than 0.5.

In one embodiment, a refractive index of the high optical density layer is not less than 1.50 and not more than 2.00, and the optical density of the low optical density layer is not less than 0.4 and not more than 2.0.

In one embodiment, a refractive index of the high optical density layer is more than 2.00 and not more than 3.00, and the optical density of the low optical density layer is not less than 1.0 and not more than 2.0.

In one embodiment, a refractive index of the high optical density layer is not less than 1.50 and not more than 2.00, and the optical density of the low optical density layer is not less than 0.5 and not more than 1.8.

In one embodiment, a refractive index of the high optical density layer is more than 2.00 and not more than 3.00, and the optical density of the low optical density layer is not less than 1.0 and not more than 1.8.

In one embodiment, where a complex refractive index is expressed by n+k*i, an extinction coefficient k of the high optical density layer is not less than 0.25.

In one embodiment, the high optical density layer contains carbon black and a photosensitive resin.

In one embodiment, the high optical density layer transmits ultraviolet light.

In one embodiment, the high optical density layer contains titanium black and a photosensitive resin.

In one embodiment, the high optical density layer is formed by a chromium film.

In one embodiment, the low optical density layer is made of the same material as that of a color filter.

In one embodiment, the low optical density layer contains a blue pigment.

In one embodiment, the low optical density layer contains a red pigment.

A display panel of the present invention includes the substrate that has the above-described configuration and an antireflection film.

In one embodiment, the antireflection film has a moth-eye structure.

In one embodiment, the moth-eye structure has a plurality of conical raised portions whose average height is not less than 10 nm and not more than 500 nm. The interval between adjacent ones of the raised portions is not less than 30 nm and not more than 600 nm.

Advantageous Effects of Invention

According to the present invention, a substrate for use in a display panel is provided in which the internal reflection caused by the light blocking layer is reduced.

BRIEF DESCRIPTION OF DRAWINGS

FIGS. 4 (*a*) and (*b*) are graphs showing the simulation results of the reflectance $R_{12}$ of a light blocking layer. (a) shows the simulation results for the case where the refractive index of a high optical density layer was 1.50. (b) shows the simulation results for the case where the refractive index of the high optical density layer was 2.00. The simulation results are shown for different OD values of a low optical density layer.

FIGS. 8 (*a*) to (*d*) are cross-sectional views for schematically illustrating the manufacture steps of the color filter substrate 10.

DESCRIPTION OF EMBODIMENTS

Hereinafter, an embodiment of the present invention is described with reference to the drawings. In the description below, the embodiment of the present invention is described with an example of a liquid crystal display panel and a substrate for use therein. However, the embodiment of the present invention is not limited to this example but may also be applicable to a display panel for PDP and an organic EL display panel.

First, the structures of a substrate 10 for use in a display panel and a liquid crystal display panel 100 which includes the substrate 10 according to the present embodiment are described with reference to FIG. 1.

Figure 1:
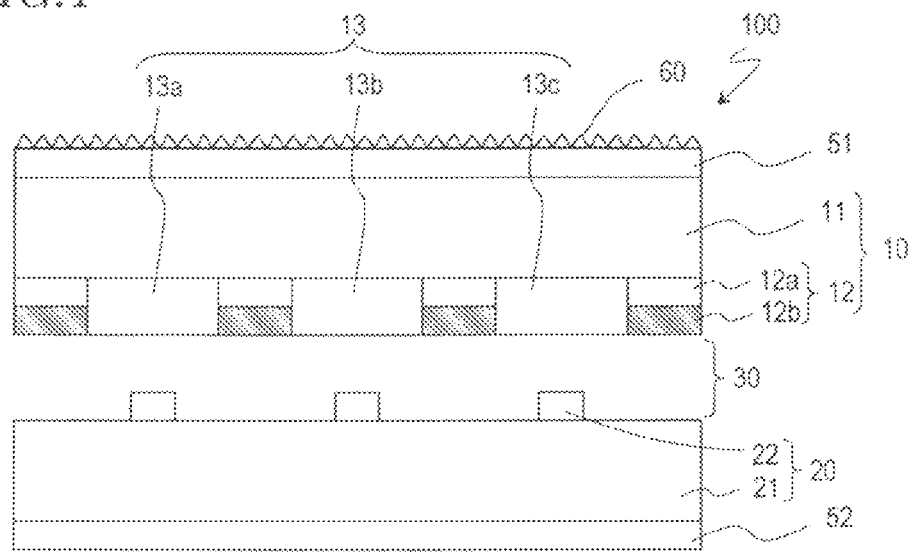
FIG. 1 A cross-sectional view schematically showing a liquid crystal display panel 100.

FIG. 1 is a cross-sectional view schematically showing a liquid crystal display panel 100. The liquid crystal display panel 100 includes a TFT substrate 20, a color filter substrate 10 which opposes the TFT substrate 20, and a liquid crystal layer 30 which is interposed between the TFT substrate 20 and the color filter substrate 10. The color filter substrate 10 is provided at the viewer side of the liquid crystal layer 30. The TFT substrate 20 is provided at the other side of the liquid crystal layer 30 which is opposite to the viewer side.

At a side of the TFT substrate 20 which is opposite to the liquid crystal layer 30, a lower polarization layer 52 is provided. At a side of the color filter substrate 10 which is opposite to the liquid crystal layer 30, an upper polarization layer 51 is provided. At the viewer side (the upper side in FIG. 1) of the upper polarization layer 51, a low reflection film 60 is provided. As the low reflection film 60, a film which has a moth-eye structure, for example, may be used. The moth-eye structure will be described in detail later. At a side of the liquid crystal display panel 100 which is opposite to the viewer side (the lower side in FIG. 1), a backlight unit may be provided (although not shown).

The color filter substrate 10 includes a transparent substrate 11, a light blocking layer 12, and a color filter layer 13. At a side of the transparent substrate 11 which is closer to the liquid crystal layer 30, the light blocking layer 12 and the color filter layer 13 are provided. The color filter layer 13 includes a first color filter 13*a*, a second color filter 13*b* and a third color filter 13*c* which allow transmission of light of different colors. The first color filter 13*a*, the second color filter 13*b* and the third color filter 13*c* are, for example, color filters of red (R), green (G) and blue (B).

The TFT substrate 20 includes a transparent substrate (e.g., glass substrate) 21 and wires 22 that are provided on a side of the transparent substrate 21 which is closer to the liquid crystal layer 30. As the TFT substrate 20, a known TFT substrate may be used, and therefore, the description of its structure is herein omitted.

Figure 2:
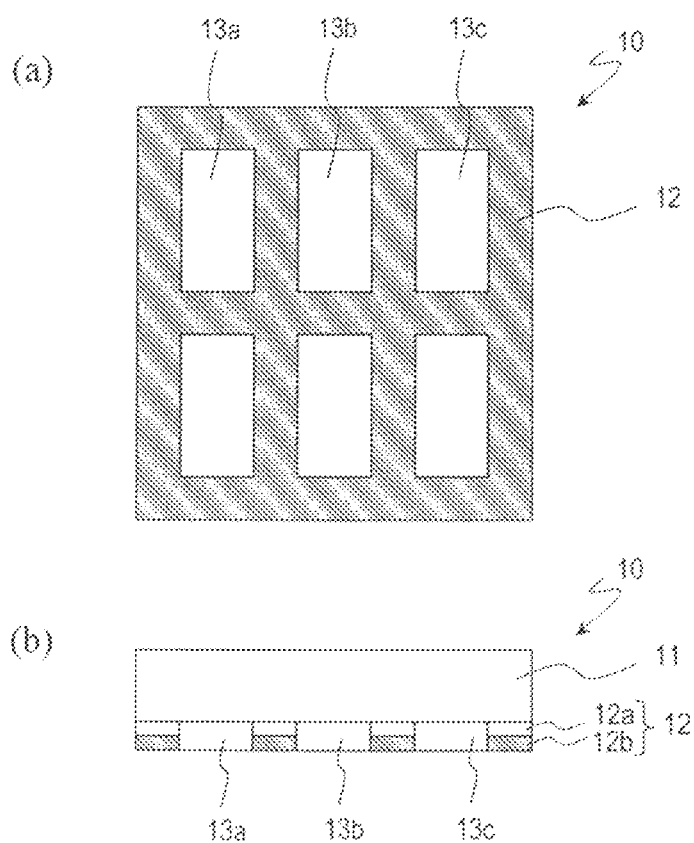
FIGS. 2 (*a*) and (*b*) are diagrams schematically showing a color filter substrate 10. (a) is a top view. (b) is a cross-sectional view.

Next, the structure of the color filter substrate 10 is described with reference to FIG. 2. FIG. 2(*a*) is a schematic top view of the color filter substrate 10 (which is seen from the viewer side). FIG. 2(*b*) is a schematic cross-sectional view of the color filter substrate 10.

The light blocking layer 12 includes two layers 12*a* and 12*b* which have different optical densities. Of the two layers 12*a* and 12*b* which have different optical densities, the layer 12*a* that has the lower optical density (hereinafter, referred to as "low optical density layer") is interposed between the other layer 12*b* that has the higher optical density (hereinafter, referred to as "high optical density layer") and the transparent substrate 11. The light blocking layer 12, as a whole, has an optical density not less than 3.0 and has a light blocking ability which is equivalent to that of a conventional light blocking layer. Here, the light blocking layer 12 is formed only by the low optical density layer 12*a* and the high optical density layer 12*b*. The sum of the optical density of the low optical density layer 12*a* and the optical density of the high optical density layer 12*b* is not less than 3.0. It should be noted, however, that the light blocking layer 12 is not limited to this example. A plurality of low optical density layers may be interposed between the transparent substrate 11 and the high optical density layer 12*b*. In this case, the plurality of low optical density layers preferably have varying optical densities such that one of the low optical density layers which is closer to the transparent substrate 11 has a lower optical density.

Hereinafter, the reasons that the internal reflection of the light blocking layer 12 of the color filter substrate 10 is reduced are described with reference to FIG. 3.

Figure 3:
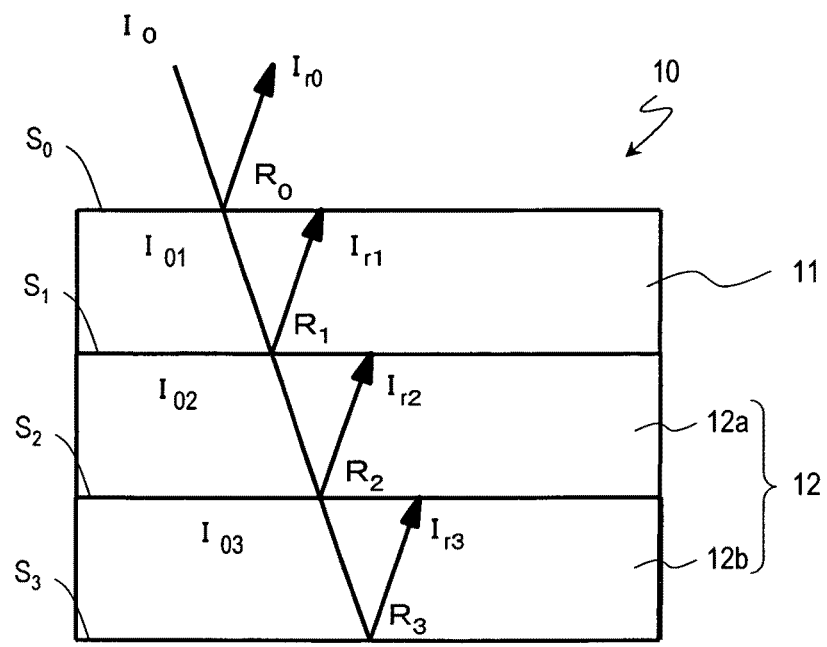
FIG. 3 A schematic cross-sectional view of the color filter substrate 10.

FIG. 3 is a schematic cross-sectional view of the color filter substrate 10. Here, light impinging on the color filter substrate 10 at the transparent substrate 11 side (upper side in FIG. 3) is considered.

Here, the reflectance of the interface $S_0$ between the transparent substrate 11 and the air is denoted by $R_0$. The reflectance of the interface $S_1$ between the transparent substrate 11 and the low optical density layer 12a is denoted by $R_1$. The reflectance of the interface $S_2$ between the low optical density layer 12a and the high optical density layer 12b is denoted by $R_2$. The reflectance of the interface $S_3$ between the high optical density layer 12b and the liquid crystal layer 30 (not shown) is denoted by $R_3$. The intensity of light impinging on the color filter substrate 10 is denoted by $I_0$. The intensity of light reflected at the interface $S_0$ is denoted by $I_{r0}$. The intensity of light that has passed through the interface $S_0$ to enter the transparent substrate 11 is denoted by $I_{01}$. The intensity of light reflected at the interface $S_1$ is denoted by $I_{r1}$. The intensity of light that has passed through the interface $S_1$ to enter the low optical density layer 12a is denoted by $I_{02}$. The intensity of light reflected at the interface $S_2$ is denoted by $I_{r2}$. The intensity of light that has passed through the interface $S_2$ to enter the high optical density layer 12b is denoted by $I_{03}$. The intensity of light reflected at the interface $S_3$ is denoted by $I_{r3}$.

Where $\alpha_3$ is the light absorption coefficient of the high optical density layer 12b and $x_3$ is the thickness of the high optical density layer 12b, the intensity $I_{r3}$ of the light reflected at the interface $S_3$ can be expressed as $I_{r3}=R_3*I_{03}(\exp(-\alpha_3*x_3))^2$ (* means multiplication). Since $\alpha_3$ of the high optical density layer 12b is large and the intensity $I_{r3}$ of the reflected light is very small, $I_{r3}$ is herein neglected. As well known in the art, the reflectance R(%) at a certain interface S is expressed by formula (1) below:

$$R(\%)=(I_r/I_0)*100 \qquad (1)$$

where $I_0$ is the intensity of light impinging on the interface S, and $I_r$ is the intensity of light reflected at the interface S.

Thus, the reflectances $R_0$, $R_1$ and $R_2$ are expressed as follows:

$$R_0(\%)=(I_{r0}/I_0)*100 \qquad (2)$$

$$R_1(\%)=(I_{r1}/I_{01})*100 \qquad (3)$$

$$R_2(\%)=(I_{r2}/I_{02})*100 \qquad (4)$$

Here, the intensity $I_{r0}$ of the light reflected at the interface $S_0$ is small because the surface of the display panel is provided with the low reflection film. Thus, $I_{01} \approx I_0$. The intensity $I_r$ of the light impinging on the light blocking layer 12 and returning to the viewer side (upper side in FIG. 3) is $I_{r1}+I_{r2}$. The intensity $I_{r1}$ of the light reflected at the interface $S_1$ can be expressed as $I_{r1}=R_1*I_{01}*(\exp(-\alpha_1*x_1))^2$ where $\alpha_1$ is the light absorption coefficient of the transparent substrate 11, and $x_1$ is the thickness of the transparent substrate 11. Considering that $\alpha_1$ of the transparent substrate 11 is generally zero (0) and that $I_{01} \approx I_0$, the intensity $I_{r1}$ can be expressed as $I_{r1}=R_1*I_0$. The intensity $I_{r2}$ of the light reflected at the interface $S_2$ can be expressed as $I_{r2}=R_2*I_{O2}*(\exp(-\alpha_2*x_2))^2$ where $\alpha_2$ is the light absorption coefficient of the low optical density layer 12a, and $x_2$ is the thickness of the low optical density layer 12a. Thus, $I_r$ can be expressed as follows using $\alpha_2$, $x_2$, $R_1$, $R_2$, $I_0$ and $I_{02}$:

$$I_r=R_1*I_0+R_2*I_{02}*(\exp(-\alpha_2*x_2))^2 \qquad (5)$$

$I_r$ expressed by formula (5) is the intensity of light reflected by the light blocking layer 12. The reflectance of the light blocking layer 12, $R_{12}$, can be expressed as follows:

$$R_{12}(\%)=(I_r/I_0)*100 \qquad (6)$$

Here, assuming that the surface reflectance of the color filter substrate 10 is $R_0$ that is expressed by formula (2) shown above, the condition under which the reflectance of the light blocking layer 12, $R_{12}$, be smaller than the surface reflectance $R_0$ of the color filter substrate 10 is determined.

The reflectance at a certain interface can be expressed using the refractive indices of two media that form the interface.

As for light traveling from a certain first medium (refractive index $n_1$) into a certain second medium (refractive index $n_2$), the reflectance of the light at the interface between the first medium and the second medium is expressed as follows:

$$R(\%)=((n_1-n_2)^2/(n_1+n_2)^2)*100 \qquad (7)$$

When it is necessary to consider absorption of light by a medium through which the light travels, a complex refractive index is used instead of each of the refractive indices of formula (7). The complex refractive index N is expressed as follows:

$$N=n+i*k \qquad (8)$$

where n is the refractive index and k is the extinction coefficient.

In the case where the first medium and the second medium absorb part of the light traveling therethrough, the complex refractive index $N_1$ of the first medium (refractive index $n_1$, extinction coefficient $k_1$) is $N_1=n_1+i*k_1$, the complex refractive index $N_2$ of the second medium (refractive index $n_2$, extinction coefficient $k_2$) is $N_2=n_2+i*k_2$, and the reflectance R at the interface between the first medium and the second medium is expressed as follows:

$$R(\%)=(((n_1-n_2)^2+(k_1-k_2)^2)/((n_1+n_2)^2+(k_1+k_2)^2))*100 \qquad (9)$$

In the color filter substrate 10, the complex refractive index $N_{11}$ of the transparent substrate 11 is $N_{11}=n_{11}+i*k_{11}$. The complex refractive index $N_{12a}$ of the low optical density layer 12a is $N_{12a}=n_{12a}+i*k_{12a}$. The complex refractive index $N_{12b}$ of the high optical density layer 12b is $N_{12b}=n_{12b}+i*k_{12b}$. Here, assuming that absorption of light does not occur in the transparent substrate 11, the extinction coefficient $k_{11}$ of the transparent substrate 11 is neglected. The refractive index of the air is $n_0$. The reflectance $R_0$ at the interface $S_0$, the reflectance $R_1$ at the interface $S_1$, and the reflectance $R_2$ at the interface $S_2$ in FIG. 3 are expressed using formula (9) as follows:

$$R_0(\%)=((n_0-n_{11})^2/(n_0+n_{11})^2)*100 \qquad (10)$$

$$R_1(\%)=(((n_{11}-n_{12a})^2+(0-k_{12a})/((n_{11}-n_{12a})^2+(0+k_{12a})^2))*100 \qquad (11)$$

$$R_2(\%)=(((n_{12a}-n_{12b})^2+(k_{12a}-k_{12b})^2)/((n_{12a}+n_{12b})^2+(k_{12a}+k_{12b})^2))*100 \qquad (12)$$

Reduction of the reflectance $R_{12}$ of the light blocking layer 12, i.e., reduction of the intensity $I_r$ of the light reflected by the light blocking layer 12, may be realized by reducing the reflectances $R_1$, $R_2$, as seen from formula (5). Since the light blocking layer 12 absorbs part of the light traveling therethrough, the reflectance $R_{12}$ is expressed by the complex refractive index (see formula (11) and formula (12)), and the reflectances $R_1$, $R_2$ can be reduced by adjusting the refractive index and the extinction coefficient.

Now, the relationship between the optical density (OD), which is commonly used as the index that represents the light blocking characteristic of the light blocking layer, and the extinction coefficient k is described. Note that the light blocking layer used in the existing liquid crystal display panels reportedly needs to have an optical density of 3.0 or more (see, for example, Patent Document 3).

The optical density (OD) is expressed as follows:

$$OD \equiv \mathrm{Log}(I_0/I) \quad (13)$$

where $I_0$ is the intensity of incoming light, and I is the intensity of transmitted light.

On the other hand, the transmitted light intensity I of the incoming light (wavelength λ) which has transmitted through a medium of extinction coefficient k and thickness x is expressed as follows:

$$I = I_0 * \exp(-4\pi k * x/\lambda) \quad (14)$$

Based on formula (13) and formula (14), OD can be modified as follows:

$$OD = (4\pi k/\lambda) * (x/2.3) \quad (15)$$

Here, it is assumed that $\log_e 10 \approx 2.3$.

When λ=550 nm and x=1 μm, the relationship between OD and k can be expressed as follows:

$$OD \approx 10k \quad (16)$$

Thus, OD depends on the extinction coefficient. Therefore, the reflectance $R_{12}$ of the light blocking layer 12 can be decreased by adjusting the value of OD.

As seen from formula (15), the optical density OD depends not only on the extinction coefficient k but also on the thickness x. Therefore, when two layers having different thicknesses are formed of the same material, these two layers have different optical densities OD. However, the effect of decreasing the reflectance $R_1$ expressed by formula (11) and the reflectance $R_2$ expressed by formula (12) cannot be obtained because the two layers have equal extinction coefficients k. Thus, the low optical density layer and the high optical density layer need to be made of materials which have different extinction coefficients k.

Traditionally, efforts have been focused mainly on the light blocking characteristic of the light blocking layer, i.e., increasing the OD value of the light blocking layer to 3.0 or more. The concept of adjusting the optical characteristic of the light blocking layer from the viewpoint of reducing the internal reflection caused by the light blocking layer has not been conceived. As described above, the present invention was conceived as a result of detailed examinations as to the optical characteristic (complex refractive index) of the light blocking layer, which were conducted for the purpose of reducing the internal reflection.

Next, the relationships between the refractive indices and the OD values of the low optical density layer 12a and the high optical density layer 12b and the reflectance $R_{12}$ of the light blocking layer 12 (formula (5)) are described with reference to the simulation results shown in FIG. 4, FIG. 5 and FIG. 6. In the simulation, the refractive index $n_{11}$ of the transparent substrate 11 is 1.50, and the extinction coefficient $k_{11}$ of the transparent substrate 11 is 0.00. Each of the low optical density layer 12a and the high optical density layer 12b has a thickness of 1.0 μm. Thus, the OD value of each of the low optical density layer 12a and the high optical density layer 12b is about 10 times its extinction coefficient k.

Figure 5:
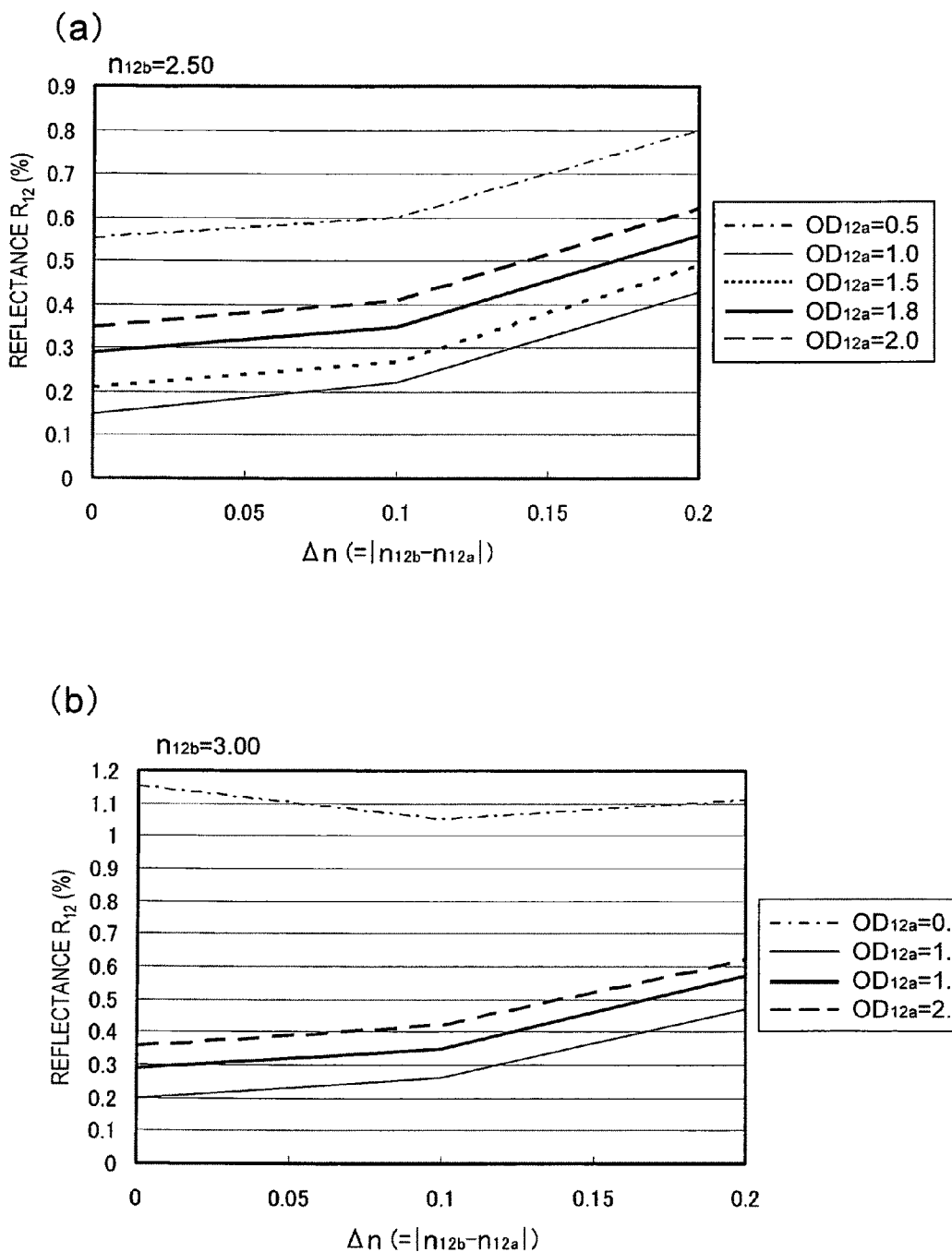
FIGS. 5 (*a*) and (*b*) are graphs showing the simulation results of the reflectance $R_{12}$ of a light blocking layer. (a) shows the simulation results for the case where the refractive index of the high optical density layer was 2.50. (b) shows the simulation results for the case where the refractive index of the high optical density layer was 3.00. The simulation results are shown for different OD values of the low optical density layer.

FIG. 4 and FIG. 5 provide the graphs showing the relationship between Δn ($=|n_{12b}-n_{12a}|$: the absolute value of the difference between the refractive index $n_{12a}$ of the low optical density layer 12a and the refractive index $n_{12b}$ of the high optical density layer 12b) and the reflectance $R_{12}$. FIG. 4(a) is for the case where the refractive index $n_{12b}$ of the high optical density layer 12b is 1.50 ($n_{12b}$=1.50). FIG. 4(b) is for the case where the refractive index $n_{12b}$ of the high optical density layer 12b is 2.00 ($n_{12b}$=2.00). FIG. 5(a) is for the case where the refractive index $n_{12b}$ of the high optical density layer 12b is 2.50 ($n_{12b}$=2.50). FIG. 5(b) is for the case where the refractive index $n_{12b}$ of the high optical density layer 12b is 3.00 ($n_{12b}$=3.00). Each graph shows the results for the cases where the low optical density layer 12a has varying values of the optical density $OD_{12a}$. FIG. 6 is a graph which shows the relationship between the optical density $OD_{12a}$ of the low optical density layer 12a and the reflectance $R_{12}$ for Δn=0.05. FIG. 6 is for the case where the refractive index $n_{12b}$ of the high optical density layer 12b is 1.50 ($n_{12b}$=1.50), as in the case of FIG. 4(a), while the refractive index $n_{12a}$ of the low optical density layer 12a is 1.55 ($n_{12a}$=1.55).

First, refer to FIG. 4(a). FIG. 4(a) is a graph showing the relationship between Δn and the reflectance $R_{12}$ for the case where the refractive index $n_{12b}$ of the high optical density layer 12b is 1.50 ($n_{12b}$=1.50) and the absolute value Δn of the difference between the refractive index $n_{12b}$ of the high optical density layer 12b and the refractive index $n_{12a}$ of the low optical density layer 12a is in the range of 0≤Δn≤0.20. FIG. 4(a) shows the results for the cases where the optical density $OD_{12a}$ of the low optical density layer 12a has varying values, 0.5, 1.0, 1.5, 1.8 and 2.0. Here, the optical density $OD_{12b}$ of the high optical density layer 12b was selected such that the sum of the optical density $OD_{12a}$ of the low optical density layer 12a ($OD_{12a}<OD_{12b}$) and the optical density $OD_{12b}$ of the high optical density layer 12b, $OD_{12a}+OD_{12b}$, was 3.0 or more.

As seen from FIG. 4(a), no matter which value $OD_{12a}$ has, the reflectance $R_{12}$ decreases as Δn decreases. There is not a significant difference between the reflectance $R_{12}$ for $OD_{12a}$=0.5 and the reflectance $R_{12}$ for $OD_{12a}$=1.0 in the range of Δn shown in FIG. 4(a) (0≤Δn≤0.20). The reflectance $R_{12}$ for $OD_{12a}$=0.5 and the reflectance $R_{12}$ for $OD_{12a}$=1.0 are smaller than the reflectances $R_{12}$ for $OD_{12a}$=1.5, 1.8, and 2.0. In the range of Δn shown in FIG. 4(a), the reflectance $R_{12}$ increases as the optical density $OD_{12a}$ increases in ascending order of $OD_{12a}$=1.5, 1.8, and 2.0.

Figure 6:
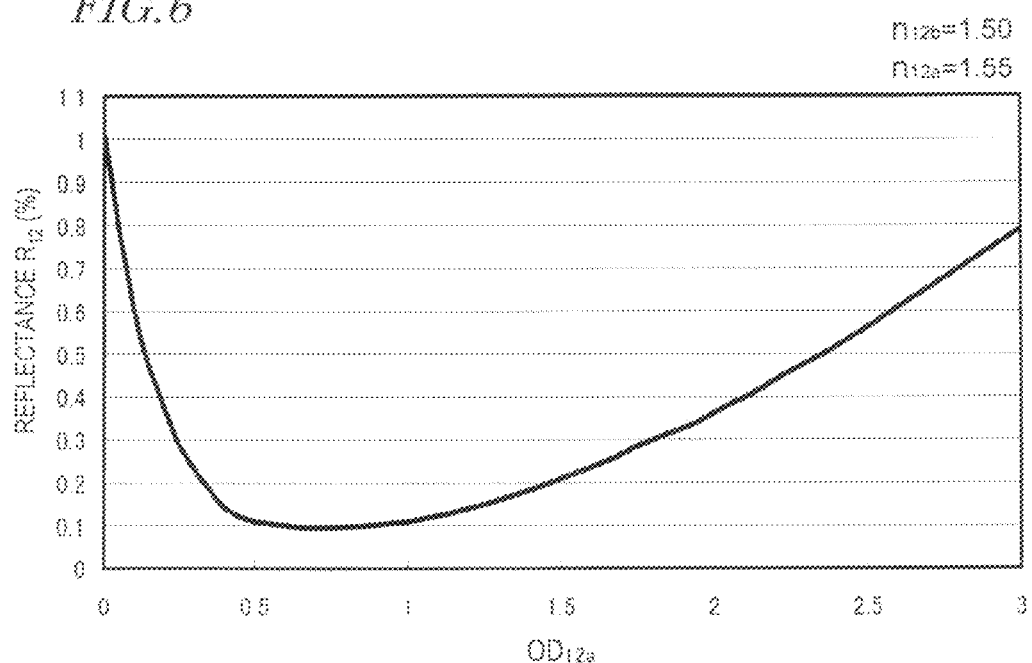
FIG. 6 A graph showing the simulation result for the case where the refractive index of a high optical density layer 12*b* is 1.50 and the refractive index of a low optical density layer 12*a* is 1.55.

Now, refer to the graph of FIG. 6. The graph shows the relationship between the optical density $OD_{12a}$ of the low optical density layer 12a and the reflectance $R_{12}$ for the case where the refractive index $n_{12b}$ of the high optical density layer 12b is 1.50 and the refractive index $n_{12a}$ of the low optical density layer 12a is 1.55 (corresponding to the case of Δn=0.05 in FIG. 4(a)).

As seen from FIG. 6, the reflectance $R_{12}$ has the local minimum value when $OD_{12a}$ is about 0.8. In that case, the reflectance $R_{12}$ is about 0.1%. When $OD_{12a}$ is 0.0, the reflectance $R_{12}$ exceeds 1%. When $OD_{12a}$ is 3.0, the reflectance $R_{12}$ is about 0.8%.

FIG. 6 shows the relationship between the optical density $OD_{12a}$ of the low optical density layer 12a and the reflectance $R_{12}$ for Δn=0.05. However, even when Δn has a also has the local different value, the reflectance $R_{12}$ minimum value when $OD_{12a}$ has a specific value. As seen from the results shown in FIG. 4(a), in the range of 0≤Δn≤0.20, the reflectance $R_{12}$ has the local minimum value when $OD_{12a}$ is in the range of, or in the vicinity of the range of, 0.5≤$OD_{12a}$≤1.0.

Thus, the condition concerning $OD_{12a}$ under which the reflectance $R_{12}$ be not more than a predetermined value can be defined as a range that covers the vicinity of a value of $OD_{12a}$ at which the reflectance $R_{12}$ has the local minimum value (a range that includes a value of $OD_{12a}$ at which the reflectance $R_{12}$ has the local minimum value). Hereinafter, the condition under which the reflectance $R_{12}$ be not more than 0.3% is described.

In the case of the refractive index $n_{12b}$=1.50, as seen from FIG. 4(a), when $OD_{12a}$ is not less than 0.5 and not more than 1.8, the reflectance $R_{12}$ can be made not more than 0.3% by setting $\Delta n$ to an appropriate value which is not more than 0.15. For example, when $OD_{12a}$ is set in the range of 0.5≤$OD_{12a}$≤1.0, the reflectance $R_{12}$ is not more than 0.3% over the entire $\Delta n$ range between 0 and 0.15. When $OD_{12a}$ is 1.5, the reflectance $R_{12}$ can be made not more than 0.3% by setting $\Delta n$ to about 0.11 or smaller.

Next, refer to FIG. 4(b). FIG. 4(b) is a graph showing the relationship between $\Delta n$ and the reflectance $R_{12}$ for the case where the refractive index $n_{12b}$ of the high optical density layer 12b is 2.00 ($n_{12b}$=2.00) and the absolute value $\Delta n$ of the difference between the refractive index $n_{12b}$ of the high optical density layer 12b and the refractive index $n_{12a}$ of the low optical density layer 12a is in the range of 0≤$\Delta n$≤0.20. FIG. 4(b) shows the results for the cases where the optical density $OD_{12a}$ of the low optical density layer 12a has varying values, 0.4, 0.5, 1.0, 1.5, 1.8, and 2.0. Here, the optical density $OD_{12b}$ of the high optical density layer 12b was selected such that the sum of the optical density $OD_{12a}$ of the low optical density layer 12a ($OD_{12a}$<$OD_{12b}$) and the optical density $OD_{12b}$ of the high optical density layer 12b, $OD_{12a}$+$OD_{12b}$, was 3.0 or more.

As seen from FIG. 4(b), when $OD_{12a}$ is not less than 1.0, the reflectance $R_{12}$ decreases as $\Delta n$ decreases. For $OD_{12a}$=0.5, the reflectance $R_{12}$ has the lowest value when $\Delta n$ is 0.05. For $OD_{12a}$=0.4, the reflectance $R_{12}$ has the lowest value when $\Delta n$ is 0.10. The reflectance $R_{12}$ has the lowest value when $OD_{12a}$ is 1.0. Thus, in the relationship between the optical density $OD_{12a}$ and the reflectance $R_{12}$, as previously described with reference to FIG. 6, the reflectance $R_{12}$ has the local minimum value when $OD_{12a}$ is about 1.0.

In the case of the refractive index $n_{12b}$=2.00, as seen from FIG. 4(b), when $OD_{12a}$ is not less than 0.5 and not more than 1.8, the reflectance $R_{12}$ can be made not more than 0.3% by setting $\Delta n$ to an appropriate value which is not more than about 0.16. For example, when $OD_{12a}$ is 1.0, the reflectance $R_{12}$ is not more than 0.3% over the entire $\Delta n$ range between 0 and about 0.16. When $OD_{12a}$ is 1.5, the reflectance $R_{12}$ can be made not more than 0.3% by setting $\Delta n$ to about 0.11 or smaller. When $OD_{12a}$ is 0.5, the reflectance $R_{12}$ can be made not more than 0.3% by setting $\Delta n$ to about 0.13 or smaller.

As previously described, in either of the cases of $n_{12b}$=1.50 (FIG. 4(a)) and $n_{12b}$=2.00 (FIG. 4(b)), when $OD_{12a}$ is not less than 0.5 and not more than 1.8, the reflectance $R_{12}$ can be made not more than 0.3% by setting $\Delta n$ to an appropriate value. Therefore, when $n_{12b}$ is not less than 1.50 and not more than 2.00, the reflectance $R_{12}$ can be made not more than 0.3% by setting $\Delta n$ to an appropriate value, so long as $OD_{12a}$ is not less than 0.5 and not more than 1.8.

Next, refer to FIG. 5(a). FIG. 5(a) is a graph showing the relationship between $\Delta n$ and the reflectance $R_{12}$ for the case where the refractive index $n_{12b}$ of the high optical density layer 12b is 2.50 ($n_{12b}$=2.50) and the absolute value $\Delta n$ of the difference between the refractive index $n_{12b}$ of the high optical density layer 12b and the refractive index $n_{12a}$ of the low optical density layer 12a is in the range of 0≤$\Delta n$≤0.20. FIG. 5(a) shows the results for the cases where the optical density $OD_{12a}$ of the low optical density layer 12a has varying values, 0.5, 1.0, 1.5, 1.8 and 2.0. Here, the optical density $OD_{12b}$ of the high optical density layer 12b was selected such that the sum of the optical density $OD_{12a}$ of the low optical density layer 12a ($OD_{12a}$<$OD_{12b}$) and the optical density $OD_{12b}$ of the high optical density layer 12b, $OD_{12a}$+$OD_{12b}$, was 3.0 or more.

As seen from FIG. 5(a), no matter which value $OD_{12a}$ has, the reflectance $R_{12}$ decreases as $\Delta n$ decreases. In the range of $\Delta n$ shown in FIG. 5(a), the reflectance $R_{12}$ for $OD_{12a}$=1.0 has the smallest value, and the reflectance $R_{12}$ for $OD_{12a}$=0.5 has the largest value. In the range of $\Delta n$ shown in FIG. 5(a), the reflectance $R_{12}$ increases as the optical density $OD_{12a}$ increases in ascending order of $OD_{12a}$=1.5, 1.8, and 2.0. Since the reflectance $R_{12}$ has the lowest value when $OD_{12a}$ is 1.0, in the relationship between the optical density $OD_{12a}$ and the reflectance $R_{12}$, as previously described with reference to FIG. 6, the reflectance $R_{12}$ has the local minimum value when $OD_{12a}$ is about 1.0.

In the case of the refractive index $n_{12b}$=2.50, as seen from FIG. 5(a), when $OD_{12a}$ is not less than 1.0 and not more than 1.8, the reflectance $R_{12}$ can be made not more than 0.3% by setting $\Delta n$ to an appropriate value which is not more than about 0.13. For example, when $OD_{12a}$ is 1.0, the reflectance $R_{12}$ is not more than 0.3% over the entire $\Delta n$ range between 0 and about 0.13. When $OD_{12a}$ is 1.5, the reflectance $R_{12}$ can be made not more than 0.3% by setting $\Delta n$ to a value which is not more than about 0.11.

Next, refer to FIG. 5(b). FIG. 5(b) is a graph showing the relationship between $\Delta n$ and the reflectance $R_{12}$ for the case where the refractive index $n_{12b}$ of the high optical density layer 12b is 3.00 ($n_{12b}$=3.00) and the absolute value $\Delta n$ of the difference between the refractive index $n_{12b}$ of the high optical density layer 12b and the refractive index $n_{12a}$ of the low optical density layer 12a is in the range of 0≤$\Delta n$≤0.20. FIG. 5(b) shows the results for the cases where the optical density $OD_{12a}$ of the low optical density layer 12a has varying values, 0.5, 1.0, 1.8 and 2.0. Here, the optical density $OD_{12b}$ of the high optical density layer 12b was selected such that the sum of the optical density $OD_{12a}$ of the low optical density layer 12a ($OD_{12a}$<$OD_{12b}$) and the optical density $OD_{12b}$ of the high optical density layer 12b, $OD_{12a}$+$OD_{12b}$, was 3.0 or more.

As seen from FIG. 5(b), when $OD_{12a}$ is not less than 1.0, the reflectance $R_{12}$ decreases as $\Delta n$ decreases. For $OD_{12a}$=0.5, the reflectance $R_{12}$ has the lowest value when $\Delta n$ is 0.10 but exceeds 1.0% over the entire tin range shown in FIG. 5(b). In the range of $\Delta n$ shown in FIG. 5(b), the reflectance $R_{12}$ for $OD_{12a}$=1.0 has the smallest value, the reflectance $R_{12}$ for $OD_{12a}$=0.5 has the largest value, and the reflectance $R_{12}$ increases as the optical density $OD_{12a}$ increases in ascending order of $OD_{12a}$=1.8, and 2.0. Since the reflectance $R_{12}$ has the lowest value when $OD_{12a}$ is 1.0, in the relationship between the optical density $OD_{12a}$ and the reflectance $R_{12}$, as previously described with reference to FIG. 6, the reflectance $R_{12}$ has the local minimum value when $OD_{12a}$ is about 1.0.

In the case of the refractive index $n_{12b}$≤3.00, as seen from FIG. 5(b), when $OD_{12a}$ is not less than 1.0 and not more than 1.8, the reflectance $R_{12}$ can be made not more than 0.3% by setting $\Delta n$ to an appropriate value which is not more than about 0.12. For example, when $OD_{12a}$ is 1.0, the reflectance $R_{12}$ is not more than 0.3% over the entire $\Delta n$ range between 0 and about 0.12.

As previously described, in either of the cases of $n_{12b}$=2.50 (FIG. 5(a)) and $n_{12b}$=3.00, when $OD_{12a}$ is not less than 1.0 and not more than 1.8, the reflectance $R_{12}$ can be made not more than 0.3% by setting $\Delta n$ to an appropriate value. On the other hand, in the case of $n_{12b}$=2.00 (FIG. 4(b)), when $OD_{12a}$ is not less than 0.5 and not more than 1.8, the reflectance $R_{12}$ can be made not more than 0.3% by setting $\Delta n$ to an appropriate value. Therefore, in the case of $n_{12b}$=2.00, the lower limit of the range of $OD_{12a}$ within which the reflectance $R_{12}$ is not more than 0.3%, i.e., 0.5, is smaller than the lower limit for the case of $n_{12b}$=2.50, i.e., 1.0. Therefore, when $n_{12b}$ is more than 2.00 and not more than 3.00, the reflectance $R_{12}$ can be made not more than 0.3% by setting $\Delta n$ to an appropriate value, so long as $OD_{12a}$ is not less than 1.0 and not more than 1.8.

The optical density $OD_{12b}$ of the high optical density layer 12b may have such a value that the sum of the optical density $OD_{12a}$ of the low optical density layer 12a and the optical density $OD_{12b}$ of the high optical density layer 12b, $OD_{12a}$+ $OD_{12b}$, is not less than 3.0. It is however preferred that $OD_{12b}$ is not more than 4.6 and/or that the difference between $OD_{12a}$ and $OD_{12b}$ is not more than 3.4. More preferably, the difference between $OD_{12a}$ and $OD_{12b}$ is not more than 3.1 (see TABLE 1). This is because, if $OD_{12b}$ is unduly large, i.e., if $k_{12b}$ is unduly large, reflectance $R_2$ (formula (12)) also becomes large. Note that $OD_{12b}$ is larger than 1.5 because $OD_{12b}$>$OD_{12a}$.

As previously described, by setting the value of the optical density of the low optical density layer 12a based on the simulation results shown in FIG. 4 and FIG. 5, the reflectance of the light blocking layer 12 can be made generally equal to or smaller than the surface reflectance ($R_0$) of the color filter substrate 10. When it is used as a color filter substrate of a display panel, by setting the optical density of the low optical density layer 12a such that the reflectance of the light blocking layer 12, $R_{12}$, is generally equal to or smaller than the reflectance of the surface of the display panel over which the low reflection film 60 is provided, the internal reflection can be reduced to a level which is generally equal to or smaller than the surface reflection.

In a display panel in which the surface reflectance is decreased to about 0.3% or smaller by means of the low reflection film 60 that has a moth-eye structure, such as the liquid crystal display panel 100, the internal reflection can be decreased to a level generally equal to or lower than the surface reflection by using the color filter substrate 10 that includes the light blocking layer 12 consisting of the low optical density layer 12a and the high optical density layer 12b which meet the above conditions. As a result, the overall reflection from the liquid crystal display panel 100 is reduced, and the display quality is improved.

As a matter of course, the color filter substrate of the present embodiment is not limited to the above example. For example, in a display panel which has a low reflection film whose surface reflectance is about 1.0% or lower, or about 0.5% or lower, a color filter substrate which meets the condition that the reflectance is about 1.0% or lower, or about 0.5% or lower, based on FIG. 4 and FIG. 5 is used, whereby the overall reflection from the display panel is reduced, and the display quality cam be improved.

The condition under which the reflectance $R_{12}$ be not more than 1.0%, or not more than 0.5%, can be estimated based on the simulation results shown in FIG. 4 and FIG. 5 as will be described below, in the same manner as previously described for the condition under which the reflectance $R_{12}$ be not more than 0.3%.

As seen from FIG. 4(a), FIG. 4(b) and FIG. 5(a), when $n_{12b}$=1.50, 2.00 and 2.50, in all the cases where the $OD_{12a}$ is not less than 0.5 and not more than 2.0, the reflectance $R_{12}$ is not more than 1.0% over the entire $\Delta n$ range between 0 and 0.2. As seen from FIG. 5(b), when $n_{12b}$=3.00, the reflectance $R_{12}$ slightly exceeds 1.0% only in the case where $OD_{12a}$ is 0.5. Therefore, the reflectance $R_{12}$ can be made generally 1.0% or lower over the entire $\Delta n$ range between 0 and 0.20 by setting the refractive index $n_{12b}$ to a value which is smaller than 3.00 and setting $OD_{12a}$ to a value which is not less than 0.5.

As seen from FIG. 4(a), when $n_{12b}$=1.50, in all the cases where $OD_{12a}$ is not less than 0.5 and not more than 2.0, the reflectance $R_{12}$ can be made not more than 0.5% by setting $\Delta n$ to an appropriate value. As seen from FIG. 4(b), when $n_{12b}$=2.00, in all the cases where $OD_{12a}$ is not less than 0.4 and not more than 2.0, the reflectance $R_{12}$ can be made not more than 0.5% by setting $\Delta n$ to an appropriate value. Thus, in the case where $n_{12b}$ is not less than 1.50 and not more than 2.00, the reflectance $R_{12}$ can be made not more than 0.5% by setting $OD_{12a}$ to a value which is not less than 0.4 and not more than 2.0 and setting $\Delta n$ to an appropriate value.

As seen from FIG. 5(a), when $n_{12b}$=2.50, in all the cases where $OD_{12a}$ is not less than 1.0 and not more than 2.0, the reflectance $R_{12}$ can be made not more than 0.5% by setting $\Delta n$ to an appropriate value. As seen from FIG. 5(b), when $n_{12b}$=3.00, in all the cases where $OD_{12a}$ is not less than 1.0 and not more than 2.0, the reflectance $R_{12}$ can also be made not more than 0.5% by setting $\Delta n$ to an appropriate value.

Thus, the lower limit of the range of $OD_{12a}$ within which the reflectance $R_{12}$ is not more than 0.5% in the case of $n_{12b}$=2.00, i.e., 0.4, is smaller than the lower limit for the case of $n_{12b}$=2.50, i.e., 1.0. Therefore, when $n_{12b}$ is more than 2.00 and not more than 3.00, the reflectance $R_{12}$ can be made not more than 0.5% by setting $\Delta n$ to an appropriate value, so long as $OD_{12a}$ is not less than 1.0 and not more than 2.0.

Here, the refractive index of a common glass substrate, 1.50, was employed as the refractive index $n_{11}$ of the transparent substrate 11. As seen from formula (11) shown above, when the difference in refractive index between the low optical density layer 12a and the transparent substrate 11 is large, the reflectance $R_1$ at the interface $S_1$ between the low optical density layer 12a and the transparent substrate 11 is large, and accordingly, the reflectance $R_{12}$ of the light blocking layer 12 is also large. Therefore, the difference in refractive index between the low optical density layer 12a and the substrate 11 is preferably small. For example, it is preferably not more than 0.17. When the difference in refractive index between the glass substrate 11 and the low optical density layer 12a exceeds 0.17, it is difficult to make the reflectance not more than 0.3% irrespective of the properties of the low optical density layer 12a and the high optical density layer 12b.

As seen from formula (15), the optical density depends on the thickness x of the layer. In the above-described simulation, the thickness of each of the low optical density layer 12a and the high optical density layer 12b is 1.0 μm. As will be described later with specific examples, even when the thickness of each layer is not 1.0 μm, the reflectance $R_{12}$ can be decreased by adjusting the extinction coefficient k and appropriately setting the optical density.

Next, a preferred range for the extinction coefficient $k_{in}$ of the high optical density layer 12b is described. The thickness of the high optical density layer 12b is preferably about 1.0 μm from the viewpoint of productivity. On the other hand, to obtain sufficient light blocking ability, $OD_{12b}$ is preferably not less than 2.5. As previously described, when the thickness of the high optical density layer 12b is 1.0 μm, $OD_{12b}$≈$10k_{12b}$ holds (formula (16)). Therefore, $k_{12b}$ is preferably not less than 0.25.

As previously described, the internal reflection caused by the light blocking layer 12 can be reduced by adjusting the optical density (extinction coefficient) and refractive index of the low optical density layer 12a that is provided between the transparent substrate 11 and the high optical density layer 12b. As a matter of course, the substrate of the embodiment of the present invention is particularly effective in a display panel whose surface reflectance is reduced to about 0.3% or less. However, the present invention is not limited to this example. By providing the low optical density layer 12a between the transparent substrate 11 and the high optical density layer 12b, the internal reflection caused by the light blocking layer 12 can be reduced as compared to a configuration where the high optical density layer 12b is directly provided on the transparent substrate 11 (a comparative example which will be described later). This is easily understood by comparing the aforementioned reflectance $R_{12}$ with the reflectance of the light blocking layer in the configuration where the high optical density layer 12b is directly provided on the transparent substrate 11 (which is obtained by replacing $n_{12a}$ with $n_{12b}$ and $k_{12a}$ with $k_{12b}$ in formula (11)).

Next, a preferred material for the high optical density layer 12b is described. As the material for the high optical density layer 12b, using a resin composition which contains carbon black and a resin, particularly a photosensitive resin, is preferred. Today, such a resin composition which contains carbon black is widely used as the material for the black matrix. As the photosensitive resin, a UV-curable acrylic resin, for example, may be used. When a resin composition which contains carbon black is used to form the high optical density layer 12b so as to have a thickness of about 1 μm, the high optical density layer 12b can have an optical density of OD=3.0 to 4.0. The refractive index of the resin composition which contains carbon black is about 1.50, and therefore, the refractive index of the high optical density layer 12b can be easily matched with the refractive index of the low optical density layer 12a. Thus, the resin composition which contains carbon black is suitable to reduction of the internal reflectance. As the material for the low optical density layer 12a, a resin composition which contains a pigment and a resin, particularly a photosensitive resin composition, is preferred as will be described later.

Using photosensitive resin compositions as the materials for the high optical density layer 12b and the low optical density layer 12a advantageously enables formation of the high optical density layer 12b and the low optical density layer 12a through a photolithography process. Particularly, when the high optical density layer 12b is capable of sufficiently transmitting ultraviolet light, the low optical density layer 12a and the high optical density layer 12b can be patterned concurrently, so that the process can advantageously be simplified. Specifically, when the ultraviolet sensitivity of the high optical density layer 12b is not less than 20% of the ultraviolet sensitivity of the low optical density layer 12a, the low optical density layer 12a and the high optical density layer 12b can be patterned concurrently. Particularly, it is preferred that the material of the high optical density layer 12b sufficiently transmits ultraviolet light used in the aforementioned photolithography process. In that case, the low optical density layer 12a and the high optical density layer 12b can be patterned concurrently, so that the manufacture process can advantageously be simplified.

As the material which is capable of transmitting ultraviolet light, a resin composition which contains titanium black and a photosensitive resin may preferably be used. When the resin composition which contains titanium black is used to form a 1 μm thick layer, the layer can have an optical density of OD=4.0 to 4.6. The resin composition which contains titanium black has a high ultraviolet transmittance, and therefore, the high optical density layer 12b can be patterned concurrently with patterning of the low optical density layer 12a. From the viewpoint of ultraviolet transmittance, titanium black is more preferred than carbon black.

As the material for the low optical density layer 12a, a resin composition which contains a pigment and a resin is preferred. Particularly, when the material used for the low optical density layer 12a is the same as that of the color filter layer 13, the low optical density layer 12a can be formed concurrently with formation of the color filter layer 13, so that the manufacture process can advantageously be simplified. As the material for the low optical density layer 12a, a resin composition which is composed of an acrylic resin and a pigment dispersed in the acrylic resin, for example, may be used.

The refractive index of the pigment used as the material for the color filter is now described. Examples of the red pigment include cadmium red and mercury sulfide. The refractive index of cadmium red is 2.60. The refractive index of mercury sulfide is 2.95. Therefore, the refractive index of the red pigment is close to 3.00. Examples of the green pigment include cobalt green and emerald. The refractive index of cobalt green is 1.97. The refractive index of emerald is 1.97. Therefore, the refractive index of the green pigment is close to 2.00. Examples of the blue pigment include cobalt blue and lapis lazuli. The refractive index of cobalt blue is 1.52. The refractive index of lapis lazuli is 1.50. Therefore, the refractive index of the blue, pigment is close to 1.50. Other usable examples of the blue pigment include copper phthalocyanine pigments, indanthrene pigments, indophenol pigments, cyanine pigments, and dioxazinine pigments.

As the material for the color filter, an organic pigment may be used. In this case, examples of the red pigment include C. I. Pigment (color index number) Red 7, 14, 41, 48:2, 48:3, 48:4, 81:1, 81:2, 81:3, 81:4, 146, 168, 177, 178, 179, 184, 185, 187, 200, 202, 208, 210, 246, 254, 255, 264, 270, 272, and 279.

A yellow pigment may be used together. In this case, examples of the yellow pigment include C. I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 138, 147, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 198, 199, 213, and 214.

Examples of the blue pigment include C. I. Pigment Blue 15, 15:1, 15:2, 15:3, 15:4, 15:6, 16, 22, 60, and 64. A violet pigment may be used together. Examples of the violet pigment include C. I. Pigment Violet 1, 19, 23, 27, 29, 30, 32, 37, 40, 42, and 50.

As seen from formula (11), the reflectance $R_1$ decreases as the refractive index of the low optical density layer 12a becomes closer to the refractive index of the transparent substrate 11. Therefore, the refractive index of the low optical density layer 12a is preferably closer to the refractive index of the transparent substrate 11. Thus, when a glass substrate (refractive index: about 1.5) is used as the transparent substrate 11, a blue pigment is preferably used as the material for the low optical density layer 12a. A plastic substrate which is recently under development also has a refractive index of about 1.5 to about 1.6. Therefore, when the plastic substrate is used as the transparent substrate 11, the blue pigment is preferred as the material for the low optical density layer 12a.

Next, an example of the method of fabricating the color filter substrate 10 shown in FIG. 1 is described. Here, a glass substrate is used as the transparent substrate 11. As the material for the low optical density layer 12a, a blue color filter material is used. As the material for the high optical density layer 12b, a photosensitive resin composition which contains carbon black is used.

First, the glass substrate 11 is provided. On the glass substrate 11, color filters 13a and 13b are photolithographically formed using color resists of red (R) and green (G). Thereafter, a color resist layer of blue (B) is formed so as to cover the color filters 13a and 13b. Then, parts of the blue color resist layer corresponding to the R and G color filters 13a and 13b are removed, whereby a B color filter 13c and a low optical density layer 12a are obtained. Then, a resist layer which contains carbon black is formed so as to cover the resultant structure. Thereafter, parts of the resist layer which contains carbon black corresponding to the R, G and B color filters 13a, 13b and 13c are removed, whereby a high optical density layer 12b is obtained. In this way, a color filter substrate which includes the light blocking layer 12 is obtained, the light blocking layer 12 including the low optical density layer 12a that is made of the same material as the blue color filter and the high optical density layer 12b that contains carbon black.

The refractive indices n and the extinction coefficients k of the low optical density layer 12a and the high optical density layer 12b may be obtained by measuring the reflectance and performing a calculation with the measured reflectance.

The method of measuring the reflectance ($R_1$) of the interface $S_1$ between the transparent substrate 11 and the low optical density layer 12a and the method of obtaining the refractive index n and the extinction coefficient k of the low optical density layer 12a are described with reference to FIGS. 7(a) and 7(b).

First, a substrate is provided in which the low optical density layer 12a is provided on the transparent substrate 11. As shown in FIG. 7(a), with light coming in at the transparent substrate 11 side, the reflectance $R_a$ at the interface $S_1$ between the transparent substrate 11 and the low optical density layer 12a is measured. The reflectance $R_a$ is measured using a microscopic reflectometer (OSP-2000 manufactured by OLYMPUS CORPORATION) with the focal point being placed at the interface $S_1$.

Figure 7:
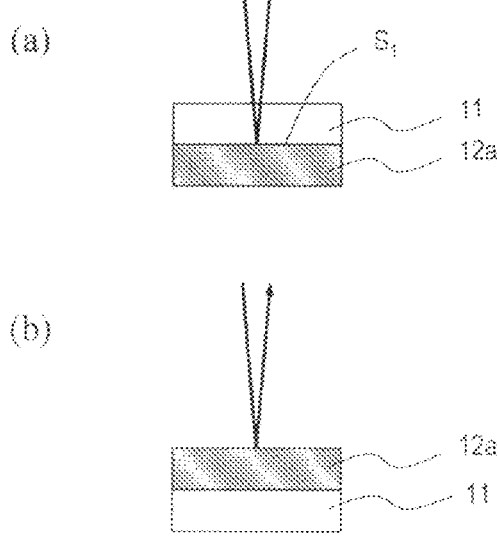
FIGS. 7 (*a*) and (*b*) are schematic cross-sectional views which illustrate the method of measuring the reflectance. (a) illustrates the case where the reflectance is measured from the transparent substrate side. (b) illustrates the case where the reflectance is measured from the low optical density layer side.

Next, as shown in FIG. 7(b), with light coming in at the low optical density layer 12a side, the reflectance $R_b$ at the surface of the low optical density layer 12a is measured. The reflectance $R_b$ is measured in the same way as that described above, using the microscopic reflectometer (OSP-2000 manufactured by OLYMPUS CORPORATION) with the focal point being placed at the surface of the low optical density layer 12a.

The refractive index n and the extinction coefficient k of the low optical density layer 12a can be obtained from the measured reflectances $R_a$ and $R_b$ as described below. Here, the transparent substrate 11 is a glass substrate (refractive index: 1.50, extinction coefficient k=0.00).

The reflectance $R_a$ at the interface $S_1$ between the transparent substrate 11 and the low optical density layer 12a can be expressed as shown below with the use of formula (11):

$$R_a(\%) = ((1.50-n_{12a})^2+(0-k_{12a})^2)/((1.50+n_{12a})^2+(0+k_{12a})^2)*100 \quad (17)$$

The reflectance $R_b$ at the surface of the low optical density layer 12a is expressed as shown below with the use of formula (9):

$$R_b(\%) = ((1.00-n_{12a})^2+(0-k_{12a})^2)/((1.00+n_{12a})^2+(0+k_{12a})^2)*100 \quad (18)$$

Here, the refractive index of the air is 1.00.

$n_{12a}$ and $k_{12a}$ can be obtained from the measured reflectances $R_a$, $R_b$ and formulae (17) and (18). Thus, the complex refractive index of the low optical density layer 12a, $N_{12a}=n_{12a}+i*k_{12a}$, can be obtained. Also, the optical density $OD_{12a}$ of the low optical density layer 12a can be obtained from the resultant $k_{12a}$ (see formula (15)).

As for the high optical density layer 12b, the complex refractive index and the optical density can be obtained likewise from the reflectances obtained by measurement.

Hereinafter, the present invention will be described in detail with examples and a comparative example.

Example 1

The substrate of Example 1 was the same as the color filter substrate 10 shown in FIG. 1 except that the color filters 13a, 13b and 13c were omitted. As the material for the low optical density layer 12a, a resin composition which contained a blue pigment (phthalocyan blue) and a photosensitive resin (acrylic resin) was used. As the material for the high optical density layer 12b, a resin composition which contained carbon black and a photosensitive resin (acrylic resin) was used.

The resin composition that contained the blue pigment was applied over a 0.7 mm thick glass substrate 11 using a spin coater. In this step, the thickness of the applied resin composition was adjusted such that $OD_{12a}$ of the low optical density layer 12a obtained after calcination was 1.49.

Then, the resultant structure was exposed with light from a super high pressure mercury lamp through a photomask. The exposed portions were removed using a developer solution, whereby the low optical density layer 12a was obtained.

Then, the resin composition that contained carbon black and the photosensitive resin was applied over the low optical density layer 12a using a spin coater. In this step, the thickness of the applied resin composition was adjusted such that $OD_{12b}$ obtained after calcination was 4.3.

With the same photomask used in the previous step being placed at the same position, the resultant structure was exposed with light from the super high pressure mercury lamp. The exposed portions were removed using a developer solution. The resultant structure was dried, whereby the high optical density layer 12b was obtained.

The reflectance of the light blocking layer which was measured using the microscopic reflectometer (OSP-2000 manufactured by OLYMPUS CORPORATION) was 0.24%. The reflectance of the light blocking layer was obtained by measuring the reflection spectrum of a sample that was subject to a measurement and the reflection spectrum of a mirror whose reflectance was known (a mirror with the reflectance of 90%) with the use of the microscopic reflectometer, dividing the reflection spectrum of the sample by the reflection spectrum of the mirror, and making a spectral luminous efficacy correction. In the examples and comparative example which will be described below, the reflectance was obtained in the same way. Note that the thickness of the low optical density layer 12a was 2 μm, and the thickness of the high optical density layer 12b was 1 μm.

The optical characteristics of Examples 1 to 4 and Comparative Example are shown below in TABLE 1.

Example 2

The substrate of Example 2 had the same configuration as that of the color filter substrate 10 shown in FIG. 1. As the material for the low optical density layer 12a, a resin composition which contained a blue pigment (phthalocyan blue) and a photosensitive resin was used. As the material for the high optical density layer 12b, a resin composition which contained titanium black (manufactured by JEMCO) and a photosensitive resin was used. As the photosensitive resin, an acrylic resin was used.

Figure 9:
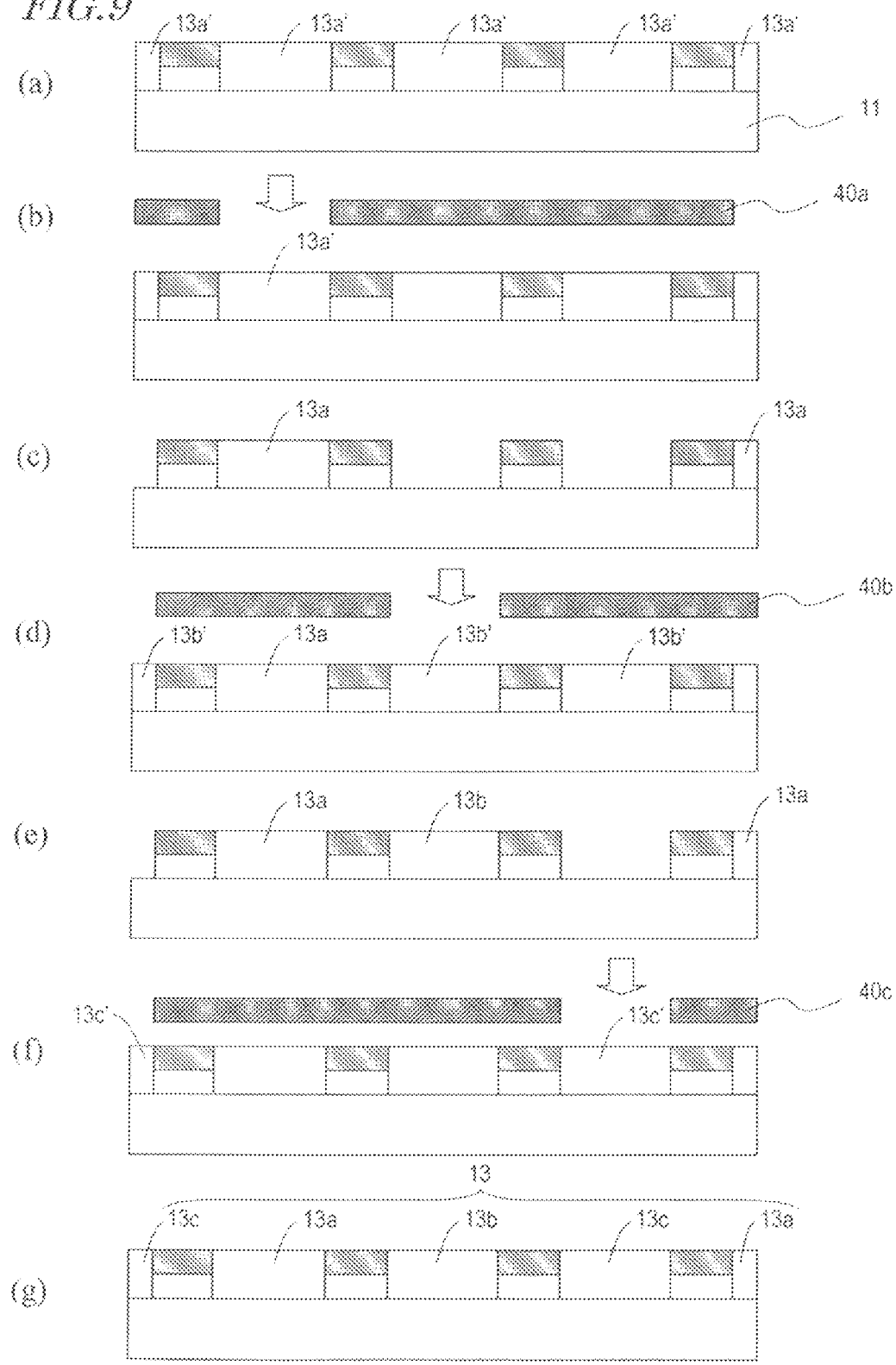
FIGS. 9 (*a*) to (*g*) are cross-sectional views for schematically illustrating the manufacture steps of the color filter substrate 10.
Figure 10:
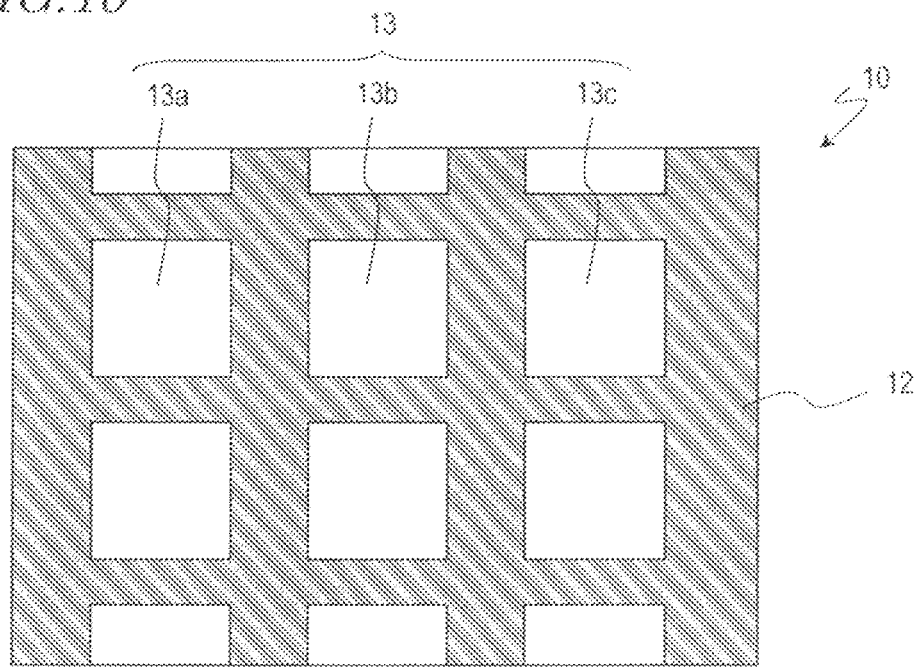
FIG. 10 A schematic top view of the color filter substrate 10.
Figure 11:
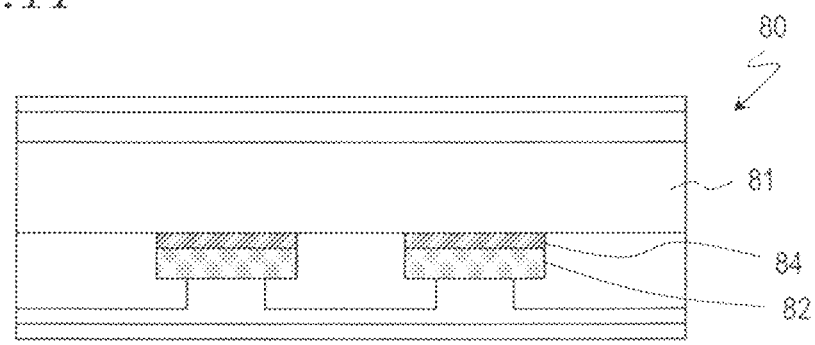
FIG. 11 A cross-sectional view of a conventional color filter substrate 80.

A method of fabricating the substrate of Example 2 is described with reference to FIG. 8 to FIG. 10.

FIGS. 8(a) to 8(d) are cross-sectional views for illustrating the manufacture steps for forming the light blocking layer 12.

First, a 0.7 mm thick glass substrate 11 is provided (FIG. 8(a)).

The resin composition that contains the blue pigment is applied over the glass substrate 11 using a spin coater, whereby a first layer 12a' is formed. Then, the resin composition that contains titanium black is applied over the first layer 12a' using a spin coater, whereby a second layer 12b' is formed (FIG. 8(b)).

Then, the resultant structure is exposed with ultraviolet light from a super high pressure mercury lamp through a photomask 40 (FIG. 8(c)).

Thereafter, unexposed portions are removed using a developer solution. The resultant structure is thermally cured, whereby the light blocking layer 12 which has the low optical density layer 12a and the high optical density layer 12b is obtained (FIG. 8(d)).

Then, the color filter layer 13 is formed. FIGS. 9(a) to 9(g) are cross-sectional views for illustrating the manufacture steps for forming the color filter layer 13.

A red resist 13a' is applied over the glass substrate 11 using a spin coater and exposed with ultraviolet light through a photomask 40a. Thereafter, unexposed portions are removed using a developer solution, whereby a red color filter 13a is obtained (FIGS. 9(a), 9(b) and 9(c)).

Then, a green resist 13b' is applied over the glass substrate 11 using a spin coater and exposed with ultraviolet light through a photomask 40b. Thereafter, unexposed portions are removed using a developer solution, whereby a green color filter 13b is obtained (FIGS. 9(d) and 9(e)).

Then, a blue resist 13c' is applied over the glass substrate 11 using a spin coater and exposed with ultraviolet light through a photomask 40c. Thereafter, unexposed portions are removed using a developer solution, whereby a blue color filter 13c is obtained (FIGS. 9(f) and 9(g)).

In this way, the color filter substrate 10 that has the color filter layer 13 can be obtained. FIG. 10 shows a schematic top view of the obtained color filter substrate 10.

The reflectance of the light blocking layer 12 which was measured using the microscopic reflectometer (OSP-2000 manufactured by OLYMPUS CORPORATION) was 0.24%. Note that the thickness of the low optical density layer 12a was 2 μm, and the thickness of the high optical density layer 12b was 1 μm.

Example 3

The substrate of Example 3 was the same as the color filter substrate 10 shown in FIG. 1 except that the color filters 13a, 13b and 13c were omitted. As the material for the low optical density layer 12a, a resin composition which contained a blue pigment (C. I. Pigment Blue 15:6) and a photosensitive resin was used. The high optical density layer 12b was formed by a chromium film. As the photosensitive resin, an acrylic resin was used.

The glass substrate 11 was provided, and the resin composition that contained the blue pigment was applied over the glass substrate 11 using a spin coater. In this step, the thickness of the applied resin composition was adjusted such that $OD_{12a}$ of the low optical density layer 12a obtained after calcination was 1.49.

Then, the resultant structure was exposed with light from a super high pressure mercury lamp through a photomask. The exposed portions were removed using a developer solution, whereby the low optical density layer 12a was obtained.

Then, a 100 nm thick chromium film was formed by sputtering over the low optical density layer 12a, whereby the high optical density layer 12b was obtained. In this case, $OD_{12b}$ of the chromium film was 4.4.

The reflectance of the light blocking layer which was measured using the microscopic reflectometer (OSP-2000 manufactured by OLYMPUS CORPORATION) was 0.20%. Note that the thickness of the low optical density layer 12a was 2 μm.

Example 4

The substrate of Example 4 was the same as the color filter substrate 10 shown in FIG. 1 except that the color filters 13a, 13b and 13c were omitted. As the material for the low optical density layer 12a, a resin composition which contained a red pigment (C. I. Pigment Red 254) and a photosensitive resin was used. As the material for the high optical density layer 12b, a resin composition which contained carbon black and a photosensitive resin was used. As the photosensitive resin, an acrylic resin was used.

Through the same manufacture steps as those described above, the low optical density layer 12a and the high optical density layer 12b were formed on the glass substrate 11, whereby the substrate 10 was obtained.

The reflectance of the light blocking layer 12 which was measured using the microscopic reflectometer (OSP-2000 manufactured by OLYMPUS CORPORATION) was 0.48%. Note that the thickness of the low optical density layer 12a was 2 μm, and the thickness of the high optical density layer 12b was 1 μm.

Comparative Example

Next, the substrate 10' of Comparative Example is described. The substrate 10' of Comparative Example included a transparent substrate 11' and a light blocking layer 12'. As the material for the light blocking layer 12', a resin composition which contained carbon black and a photosensitive resin was used. The substrate 10' of Comparative Example was obtained by the following steps: applying the resin composition that contained carbon black and the photosensitive resin over a 0.7 mm thick glass substrate 11' using a spin coater; exposing the resultant structure with light from a super high pressure mercury lamp through a photomask; removing the exposed portions using a developer solution; and thermally curing the resultant structure to form a light blocking layer 12'.

The reflectance of the light blocking layer 12' which was measured using the microscopic reflectometer (OSP-2000 manufactured by OLYMPUS CORPORATION) was 2.03%. Note that the thickness of the light blocking layer 12' was 1 μm.

The characteristics of the substrates 10 of Examples 1 to 4 and the substrate 10' of Comparative Example are shown in TABLE 1 for the sake of comparison. In TABLE 1, the refractive index ($n_{12a}$), the extinction coefficient ($k_{12a}$) and the optical density ($OD_{12a}$) of the low optical density layer 12a, the refractive index ($n_{12b}$), the extinction coefficient ($k_{12b}$) and the optical density ($OD_{12b}$) of the high optical density layer 12b, and the reflectances of the light blocking layers of Examples 1 to 4 ("Ex. 1" to "Ex. 4") and Comparative Example ("Comp.") are shown. The refractive index, the extinction coefficient and the optical density of the light blocking layer 12' of the comparative example 10' are shown in the columns of "$n_{12b}$", "$k_{12b}$" and "$OD_{12b}$", respectively.

TABLE 1

|  | Low OD Layer 12a | | | High OD Layer 12b | | | $OD_{12a} + OD_{12b}$ | Reflectance |
|---|---|---|---|---|---|---|---|---|
|  | $n_{12a}$ | $k_{12a}$ | $OD_{12a}$ | $n_{12b}$ | $k_{12b}$ | $OD_{12b}$ | | |
| Ex. 1 | 1.51 | 0.08 | 1.49 | 1.50 | 0.43 | 4.3 | 5.79 | 0.24% |
| Ex. 2 | 1.51 | 0.08 | 1.49 | 2.0 | 0.46 | 4.6 | 6.09 | 0.24% |
| Ex. 3 | 1.51 | 0.08 | 1.49 | 3.47 | 4.41 | 4.4 | 5.89 | 0.20% |
| Ex. 4 | 1.70 | 0.05 | 0.89 | 1.50 | 0.43 | 4.3 | 5.19 | 0.48% |
| Comp. | — | — | — | 1.50 | 0.43 | 4.3 | 4.3 | 2.03% |

As seen from TABLE 1, in either of Examples 1 to 4, both $OD_{12a} < OD_{12b}$ and $OD_{12a} + OD_{12b} \geq 3.0$ held. It is confirmed that, when these two conditions are met, the reflectance $R_{12}$ of the light blocking layer can be reduced. In either of Example 1 and Example 2, both $1.50 \leq n_{12b} \leq 2.00$ and $0.50 \leq D_{12a} \leq 1.8$ held. It is thus confirmed that the above-described condition under which the reflectance $R_{12}$ be not more than 0.3% was met. On the other hand, in Example 4, the reflectance of the light blocking layer was not less than 0.3%, even though the optical density $OD_{12a}$ of the low optical density layer 12a met the above-described condition under which the reflectance $R_{12}$ be not more than 0.3% ($0.5 \leq OD_{12a} \leq 1.8$). This is probably attributed to a large difference in refractive index between the low optical density layer 12a and the glass substrate 11 (0.20) and a large intensity of the light reflected at the interface between the glass substrate 11 and the low optical density layer 12a in the substrate of Example 4. Note that, in Example 4, both $1.50 \leq n_{12b} \leq 2.00$ and $0.4 \leq OD_{12a} \leq 2.0$ held, and the above-described condition under which the reflectance $R_{12}$ be not more than 0.5% was met.

In either of Examples 1, 2 and 4, the thickness of the low optical density layer 12a was 2 µm. In the above-described simulation, the thickness of either of the low optical density layer 12a and the high optical density layer 12b was 1 µm. However, as seen from the results of Examples 1, 2 and 4 in which the thickness of the low optical density layer 12a was 2 µm, it was confirmed that the condition defined for reduction of the reflectance, which has previously been described with reference to the simulation results (FIG. 4 and FIG. 5), is applicable to a case where the thickness of the respective layer is not 1 µm. In other words, it was confirmed that the reflectance $R_{12}$ can be reduced by appropriately setting the optical density even when the thickness of the respective layer is not 1 µm.

In the above-described simulation, the high optical density layer 12b was made of a resin in which carbon black or titanium black was dispersed ($n_{12b} \leq 3.00$). However, as in Example 3, the reflectance can be not more than 0.3% even when $n_{12b}$ exceeds 3.00. Other simulations were performed, which were the same as those described above ($n_{12b} = 1.50$, 2.00, 2.50 and 3.00) except that $n_{12b} = 3.50$ and $OD_{12a}$ was 1.0, 1.5, 2.0 and 3.0. It was found that, when $OD_{12a}$ is 1.5 and $\Delta n$ is not less than 1.96 and not more than 2.00, the reflectance $R_{12}$ of the light blocking layer is not more than 0.3%. The values of $n_{12a}$, $OD_{12a}$ and $n_{12b}$ of the substrate of Example 3 (which are shown in TABLE 1) are close to the values of $n_{12a}$, $OD_{12a}$ and $n_{12b}$ obtained as a result of the simulation where $n_{12b} = 3.50$, with which the reflectance $R_{12}$ was not more than 0.3%. It was confirmed that the reflectance can be not more than 0.3% so long as the condition defined based on the simulation results is met, even when $n_{12b}$ exceeds 3.00.

In the examples described above, the light blocking layer 12 consists only of the low optical density layer 12a and the high optical density layer 12b, although the light blocking layer is not limited to this configuration. A plurality of low optical density layers may be provided between the transparent substrate and the high optical density layer. The reflectance of the light blocking layer can be reduced according to the same principle as that applied to a configuration where the light blocking layer consists only of the low optical density layer and the high optical density layer.

Next, the liquid crystal display panel 100 that includes the color filter substrate 10 is described. The liquid crystal display panel 100 described herein has the same configuration as that of the liquid crystal display panel 100 that has been previously described with reference to FIG. 1.

The liquid crystal display panel 100 includes the color filter substrate 10 and an antireflection film 60. In the liquid crystal display panel 100, the substrate 10 of the present embodiment is used as the color filter substrate 10. Since the liquid crystal display panel 100 includes the antireflection film 60, the surface reflectance can be reduced. Also, in the liquid crystal display panel 100, the internal reflectance of the display panel can be reduced to a level that is generally equal to or lower than the surface reflectance. As a result, the overall reflection from the liquid crystal display panel 100 is reduced, so that the display quality is improved.

The moth-eye structure which is used as the low reflection structure of the display panel is now described. The moth-eye structure has a plurality of conical raised portions whose average height is not less than 10 nm and not more than 500 nm. The interval between adjacent ones of the raised portions is not less than 30 nm and not more than 600 nm. With the plurality of conical raised portions arranged on the viewer side of the display panel, the refractive index at the surface continuously changes from the air layer toward the inside of the display panel. Therefore, an optical interface is unlikely to be formed. Since the raised portions have a smaller size than the wavelength of light, the light travels according to the average refractive index. Therefore, incoming light behaves as if there was no interface, so that the surface reflection is reduced. As a result, the surface reflectance can be reduced to about 0.3% or smaller.

More preferably, the average height of the plurality of conical raised portions is not less than 10 nm and not more than 200 nm. When the average height exceeds 200 nm, light coming in at the surface that has the raised portions is reflected and scattered so that it looks whitish. Also, the reflectance may increase. When the plurality of conical raised portions whose average height is not less than 10 nm and not more than 200 nm are used, scattered light is very small, so that the reflectance can be reduced.

As previously described, according to the present invention, the reflectance of the light blocking layer of a substrate which is for used in a display panel can be reduced. By using the substrate of the present invention as a color filter substrate of a display panel which has a low reflection film at its surface, the internal reflectance of the display panel can be reduced to a level that is generally equal to or lower than the surface reflectance. As a result, the overall reflection from the display panel is reduced, so that the display quality is improved.

INDUSTRIAL APPLICABILITY

A substrate of the present invention is applicable to a variety, of display panels.

| REFERENCE SIGNS LIST | |
|---|---|
| 10, 20, 80 | substrate |
| 11, 21, 81 | transparent substrate |
| 12, 82 | light blocking layer |
| 12a | low optical density layer |
| 12b | high optical density layer |
| 13 | color filter layer |
| 13a, 13b, 13c | color filter |
| 13a', 13b', 13c' | color resist |
| 22 | wire |
| 30 | liquid crystal layer |
| 40, 40a, 40b, 40c | photomask |
| 51, 52 | polarization layer |
| 60 | low reflection film |
| 84 | antireflection layer |
| 100 | liquid crystal display panel |

The invention claimed is:

1. A panel substrate for use in a display panel, comprising a transparent substrate and a light blocking layer which includes two layers of different optical densities,
wherein a low optical density layer that is one of the two layers of different optical densities which has a lower optical density is interposed between a high optical density layer that is the other one of the two layers which has a higher optical density and the transparent substrate, and
a sum of an optical density of the low optical density layer and an optical density of the high optical density layer is not less than 3.0,
a refractive index of the high optical density layer is not less than 1.50 and not more than 2.00, and
the optical density of the low optical density layer is not less than 0.4 and not more than 2.0.

2. The panel substrate of claim 1, wherein
the optical density of the low optical density layer is not less than 0.5 and not more than 1.8.

3. The panel substrate of claim 1 wherein, where a complex refractive index is expressed by n+k*i, an extinction coefficient k of the high optical density layer is not less than 0.25.

4. The panel substrate of claim 1, wherein the high optical density layer contains carbon black and a photosensitive resin.

5. The panel substrate of claim 1, wherein the high optical density layer contains titanium black and a photosensitive resin.

6. The panel substrate of claim 1, further comprising:
a color filter, wherein the low optical density layer is made of the same material of the color filter.

7. The panel substrate of claim 6, wherein the low optical density layer contains a blue pigment.

8. The panel substrate of claim 6, wherein the low optical density layer contains a red pigment.

9. A display panel, comprising the panel substrate as set forth in claim 1 and an antireflection film.

10. The display panel of claim 9, wherein the antireflection film has a moth-eye structure.

* * * * *